(12) United States Patent
Kumagai et al.

(10) Patent No.: US 8,638,039 B2
(45) Date of Patent: Jan. 28, 2014

(54) ELECTRONIC BALLAST AND METHOD FOR PROVIDING A DC VOLTAGE COMPONENT DURING LAMP STARTUP

(75) Inventors: Jun Kumagai, Suita (JP); Naoki Komatu, Kobe (JP); Nobuo Ukita, Himeji (JP); Kazuhiko Harada, Himeji (JP)

(73) Assignee: Panasonic Corporation, Osaka (JP)

( * ) Notice: Subject to any disclaimer, the term of this patent is extended or adjusted under 35 U.S.C. 154(b) by 585 days.

(21) Appl. No.: 12/890,430

(22) Filed: Sep. 24, 2010

(65) Prior Publication Data
US 2011/0074307 A1 Mar. 31, 2011

(30) Foreign Application Priority Data
Sep. 25, 2009 (JP) ................................. 2009-221593

(51) Int. Cl.
*H05B 37/02* (2006.01)
(52) U.S. Cl.
USPC .................................................... 315/209 R
(58) Field of Classification Search
USPC ..... 315/224, 209 T, 209 CD, 209 M, 209 PZ, 315/209 SC, 246, 209 R, 360, 219, 225, 291, 315/307
See application file for complete search history.

(56) References Cited

U.S. PATENT DOCUMENTS

| 5,434,474 | A  | * | 7/1995  | Ukita et al. | 315/128 |
| 5,742,132 | A  | * | 4/1998  | Huber et al. | 315/209 R |
| 6,057,652 | A  | * | 5/2000  | Chen et al. | 315/307 |
| 6,144,172 | A  | * | 11/2000 | Sun | 315/291 |
| 6,426,597 | B2 | * | 7/2002  | Rast et al. | 315/219 |
| 6,448,720 | B1 | * | 9/2002  | Sun | 315/219 |
| 6,593,703 | B2 | * | 7/2003  | Sun | 315/224 |
| 2005/0269963 | A1 | * | 12/2005 | Komatsu et al. | 315/209 R |

FOREIGN PATENT DOCUMENTS

JP 20040147300 5/2004

* cited by examiner

*Primary Examiner* — Minh D A
(74) *Attorney, Agent, or Firm* — Waddey Patterson; Mark J. Patterson; Gary L. Montle

(57) ABSTRACT

A discharge lamp ballast and method of operation are provided for generating a DC component in an output voltage during a lamp starting operation having a predetermined duration. The ballast includes an inverter having four switches arranged in a full-bridge configuration, a resonant circuit having a resonant frequency, and a control circuit. The method includes a step of sweeping an inverter operating frequency within a predetermined frequency range including the resonant frequency, wherein a high voltage is generated for igniting the lamp. The method further includes periodically and alternately repeating a first state of turning on a first set of diagonally positioned switching elements and turning off a second set of diagonally positioned switching elements, and a second state of turning on only one of the second set of switching elements and turning off the remaining three switching elements, respectively.

18 Claims, 16 Drawing Sheets

ELECTRONIC BALLAST AND METHOD FOR PROVIDING A DC VOLTAGE COMPONENT DURING LAMP STARTUP

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-221593, filed Sep. 25, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to electronic ballasts for powering discharge lamps, and light fixtures making use of the same.

Discharge lamp ballasts for powering HID lamps utilizing arc discharge in high-voltage metal vapor are conventionally known in the art. With reference to FIG. 21, such a discharge lamp ballast is provided with a DC power supply 2 which converts AC power input from an AC power source 1 to DC power with a predetermined voltage, an inverter 3 which converts the DC power output from the DC power supply 2 to AC power and provides the AC power to a discharge lamp DL, and a control circuit 4 which controls the inverter 3.

The DC power supply 2 as shown in FIG. 21 is provided with a diode bridge DB connected to the AC power source 1 via a proper fuse or filter, a DC output terminal on a low voltage side thereof connected to ground, a series circuit of an inductor L3 and a switching element Q5 connected across DC output terminals of the diode bridge DB, and a series circuit of a diode D5 and an output capacitor C5 connected in parallel with the switching element Q5. The DC power supply 2 as shown provides a voltage across the output capacitor C5 as an output voltage. That is, the DC power supply 2 includes a well-known boost converter (a step-up chopper circuit, or power factor correction (PFC) circuit) connected across output terminals of the diode bridge DB. Further, the DC power supply 2 is provided with a power supply drive circuit 21 for ON/OFF-driving the switching element Q5 periodically at such an on-duty as to keep the voltage across the output capacitor C5 (namely, the output voltage of the DC power supply 2) constant.

The inverter 3 as shown in FIG. 21 includes two sets of series circuits in a full-bridge configuration, each set connected across output terminals of the DC power supply 2 and including two of the switching elements Q1 to Q4. Each of the switching elements Q1 to Q4 in the inverter 3 is, for example, a MOSFET including a parasitic diode (a body diode), and is connected such that a forward direction of the body diode is a direction opposite to the output of the DC power supply 2. Two switching elements Q2 and Q4 on a low voltage side of the switching elements Q1 to Q4 are each connected to an output terminal on the low voltage side of the DC power supply 2 via a sense resistor R2.

The discharge lamp DL in the example shown may be an HID lamp ("high-pressure discharge lamp"), one end of the discharge lamp DL being connected to a node between switching elements Q3 and Q4 of one of the series circuits (the switching element Q3 on the high voltage side of these switching elements Q3 and Q4 is hereinafter called "third switching element Q3", while the switching element Q4 on the low voltage side thereof is hereinafter called "fourth switching element Q4") via a first inductor L1. The other end of the lamp DL is connected to a node between switching elements Q1 and Q2 of the other of the series circuits (the switching element Q1 on the high voltage side of these switching elements Q1 and Q2 is hereinafter called "first switching element Q1", while the switching element Q2 on the low voltage side thereof is hereinafter called "second switching element Q2") via a second inductor L2.

A first capacitor C1 is connected in parallel with the series circuit of the second inductor L2 and the discharge lamp DL for ripple reduction. Furthermore, a node between switching elements Q2 and Q4 on the low voltage side and the sense resistor R2 is connected to ground via a series circuit of two diodes D1 and D2, the cathode of each of the diodes being directed toward the ground, and a resistor. The diodes D1 and D2 cause current flowing in a resonant circuit configured by a second capacitor C2 and the second inductor L2 (i.e., resonant current) to bypass the sense resistor R2 such that the resonant current does not flow in the sense resistor R2. Further, the second inductor L2 as shown is configured as an auto-transformer with a tap connected to a node between the two diodes D1 and D2 via a series circuit of the second capacitor C2 and the resistor R1.

The control circuit 4 is provided with switch drive circuits 41 and 42 which drive ON/OFF the respective switching elements Q1 to Q4 in the inverter 3, and an integrated circuit 40 or the equivalent which controls the drive circuits 41 and 42. Because such a control circuit 4 can be realized utilizing a number of well-known techniques, detailed illustration and explanation are omitted.

The integrated circuit 40 is connected to a node between the sense resistor R2 and the switching elements Q2 and Q4, and a node between the second inductor L2 and the switching elements Q1 and Q2. That is, the integrated circuit 40 detects output current (hereinafter, called "lamp current") from the inverter 3 to the discharge lamp DL based upon a voltage across the sense resistor R2 and detects an output voltage (hereinafter, called "lamp voltage") from the inverter 3 to the discharge lamp DL based upon a potential of a node between the second inductor L2 and the switching elements Q1 and Q2 with respect to ground. Further, the first inductor L1 is provided with a secondary winding having a tap connected to the ground, and both ends of the secondary winding are connected to the integrated circuit 40 via diodes D3 and D4, respectively.

Operation of the above-mentioned discharge lamp ballast will be explained below. When power is turned on, the control circuit 4 performs a starting operation which causes the inverter 3 to output a high voltage as required to initiate discharge in the discharge lamp DL. Specifically, the respective switching elements Q1 to Q4 in the inverter 3 are driven ON/OFF periodically such that switching elements Q1 to Q4 which are positioned diagonally to each other in the full-bridge configuration are simultaneously turned on, and those connected serially to each other are alternately turned on. The frequency for ON/OFF-driving is set to a resonant frequency (for example, 120 kHz which is a secondary resonant frequency of one third of a reference resonant frequency 360 kHz) of the resonant circuit including the second inductor L2 and the second capacitor C2. During the starting operation, a resonant voltage generated at a node between the second inductor L2 and the second capacitor C2 is boosted at the second inductor L2 serving as the auto-transformer to be output to the discharge lamp DL, and thereby discharge lamp DL lamp ignites. When the discharge lamp DL ignites, current starts to flow in the discharge lamp DL, wherein the control circuit 4 detects lighting of the discharge lamp DL based upon current induction by the secondary winding in the first inductor L1 to flow in the discharge lamp DL via the diodes D3 and D4, and operation of the discharge lamp DL proceeds next to an electrode heating operation.

The electrode heating operation P2 will be explained with reference to FIG. 22. The horizontal axis represents time, with each of graphs Q1 to Q4 indicating an ON-period of the associated switching element. The same holds true for various figures further described below. In the electrode heating operation P2, as shown in FIG. 22, the control circuit 4 first turns on respective switching elements (for example, the first switching element Q1 and the fourth switching element Q4) in one set of switching elements Q1 to Q4 positioned diagonally to each other, and turns off the respective switching elements (for example, the second switching element Q2 and the third switching element Q3) in the other set, respectively. Thereby, current (hereinafter, called "circuit current") flowing in the first inductor L1 gradually increases, so that energy is accumulated in the respective inductors L1 and L2, respectively.

When the circuit current has reached a predetermined value, the control circuit 4 turns off one switching element (for example, the fourth switching element Q4) in the set which has been turned on. After a predetermined period of time has elapsed, the control circuit 4 turns off the other switching element (for example, the switching element Q1). During a period where at least three of the switching elements Q1 to Q4 have been turned off, the circuit current flows in a gradually decreasing manner due to energy discharge from the respective inductors L1 and L2 through a loop including the body diodes of the switching elements Q1 and Q4 which were previously in an ON state and the output capacitor C5 in the DC power supply 2. When the circuit current has reached zero, the control circuit 4 turns on the respective switching elements Q1 and Q4 in the one set, and it repeats a similar operation for a predetermined number of times. Thereafter, as shown by the right half of the chart in FIG. 22, the switch sets are reversed with regards to the ON/OFF control operation.

In the above example, the first switching element Q1 and the fourth switching element Q4 are maintained in off states, respectively, while the second switching element Q2 and the third switching element Q3 are now controlled ON/OFF as described above. Thereby, the polarity of the circuit current is inverted and again as previously described a similar ON/OFF-control is repeated for a predetermined number of times. This operation of switch set reversal and polarity inversion with regards to the circuit current may again be repeated as needed or as predetermined thereafter. This polarity inversion of the circuit current may be performed at a frequency of 100 Hz to 200 Hz.

When the lamp voltage has reached a predetermined voltage during the electrode heating operation P2, the control circuit 4 makes a transition to a stable (i.e., "steady-state" as further referred to herein) lighting operation P3 for maintaining lighting of the discharge lamp DL. In the steady-state lighting operation P3, as shown in FIG. 23, the control circuit 4 first turns on respective switching elements (for example, the first switching element Q1 and the fourth switching element Q4) in one set of the switching elements Q1 to Q4 positioned diagonally to each other and turns off the respective switching elements (for example, the second switching element Q2 and the third switching element Q3) in the other set, respectively. Thereby, the circuit current gradually increases, so that energy is accumulated in the respective inductors L1 and L2, respectively. When the circuit current has reached a predetermined value, the control circuit 4 turns off one switching element (for example, the fourth switching element Q4) in the set which has been turned on. Thereby, the circuit current flows in a gradually decreasing manner due to energy discharge from the respective inductors L1 and L2 through a loop including the body diodes of the switching elements Q1 and Q4 which were previously in an ON state and the output capacitor C5 in the DC power supply 2. When the circuit current has reached zero, the control circuit 4 turns on the one switching element (the fourth switching element Q4 in the above example) and it repeats a similar operation for a predetermined number of times. Thereafter, as shown in the right half of the chart in FIG. 23, the switch sets are reversed with regards to the ON/OFF control operation.

In the above example, the first switching element Q1 and the fourth switching element Q4 are maintained in off states, respectively, while the second switching element Q2 and the third switching element Q3 are now controlled ON/OFF as described above. Thereby, the polarity of the circuit current is inverted and again as previously described a similar ON/OFF-control is repeated for a predetermined number of times. This operation of switch set reversal and polarity inversion with regards to the circuit current may again be repeated as needed or as predetermined thereafter. This polarity inversion of the circuit current may be performed at a frequency of 100 Hz to 200 Hz.

In the abovementioned discharge lamp ballast, the frequency of the output to the discharge lamp DL during the starting operation is set to be very high as compared with the frequency thereof during the electrode heating operation or the steady-state lighting operation performed thereafter. Accordingly, even if the discharge lamp DL during the starting operation starts to ignite, current flows in the first capacitor C1 connected in parallel with the discharge lamp DL, and extinguishing of the discharge lamp DL easily occurs due to the lack of lamp current required for maintaining discharge in the discharge lamp DL.

BRIEF SUMMARY OF THE INVENTION

A discharge lamp ballast and a light fixture incorporating the same are provided in accordance with the present invention which substantially reduces the likelihood of a discharge lamp being extinguished during or just after a starting operation.

In an embodiment, a discharge lamp ballast in accordance with the present invention includes an inverter circuit having first and second pairs of switching elements positioned diagonally from each other among four switching elements in a full bridge configuration, and a resonant circuit connected between output terminals of the switch pairs, the inverter circuit further adapted to output AC power for driving a discharge lamp. A control circuit is adapted to control switch states of the switching elements and thereby to generate the output AC power. The control circuit during a starting operation is further adapted to control the inverter switching elements for a predetermined time so as to make an operating frequency of the output AC power sufficiently close to a resonant frequency of the resonant circuit, wherein a high voltage is generated for igniting the discharge lamp, and the control circuit is further adapted to control the inverter switching elements so as to generate a DC component in the output voltage during the starting operation.

In another embodiment, a discharge lamp ballast and method of operation are provided for generating a DC component in an output voltage during a lamp starting operation having a predetermined duration. The ballast includes an inverter having four switches arranged in a full bridge configuration, a resonant circuit having a resonant frequency, and a control circuit. The method includes a step of sweeping an inverter operating frequency within a predetermined frequency range including the resonant frequency, wherein a high voltage is generated for igniting the lamp. The method further includes periodically and alternately repeating a first state of turning on a first set of diagonally positioned switching elements and turning off a second set of diagonally positioned switching elements, and a second state of turning on only one of the second set of switching elements and turning off the remaining three switching elements, respectively.

In another embodiment, a light fixture is provided which includes a lamp housing adapted to secure a discharge lamp, a discharge lamp ballast which further includes an inverter circuit having four switches arranged in a full bridge configuration, a resonant circuit having a resonant frequency and a control circuit, and a main housing adapted to secure the discharge lamp ballast. The control circuit is adapted during a starting operation having a predetermined time duration to adjust an operating frequency of the inverter switches within a predetermined sweep frequency range including the resonant frequency of the resonant circuit, wherein a high voltage is generated near the resonant frequency for igniting the discharge lamp during the starting operation. The control circuit is further adapted during the starting operation to periodically and alternately repeat a state of turning on a first set of switching elements positioned diagonally with respect to each other and turning off a second set switching elements positioned diagonally with respect to each other, and a state of turning on only one of the second set of switching elements and turning off the remaining three switching elements, respectively, so as to generate a DC component in the output voltage during the starting operation.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The terms "connected" and "coupled" mean at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Figure 21:
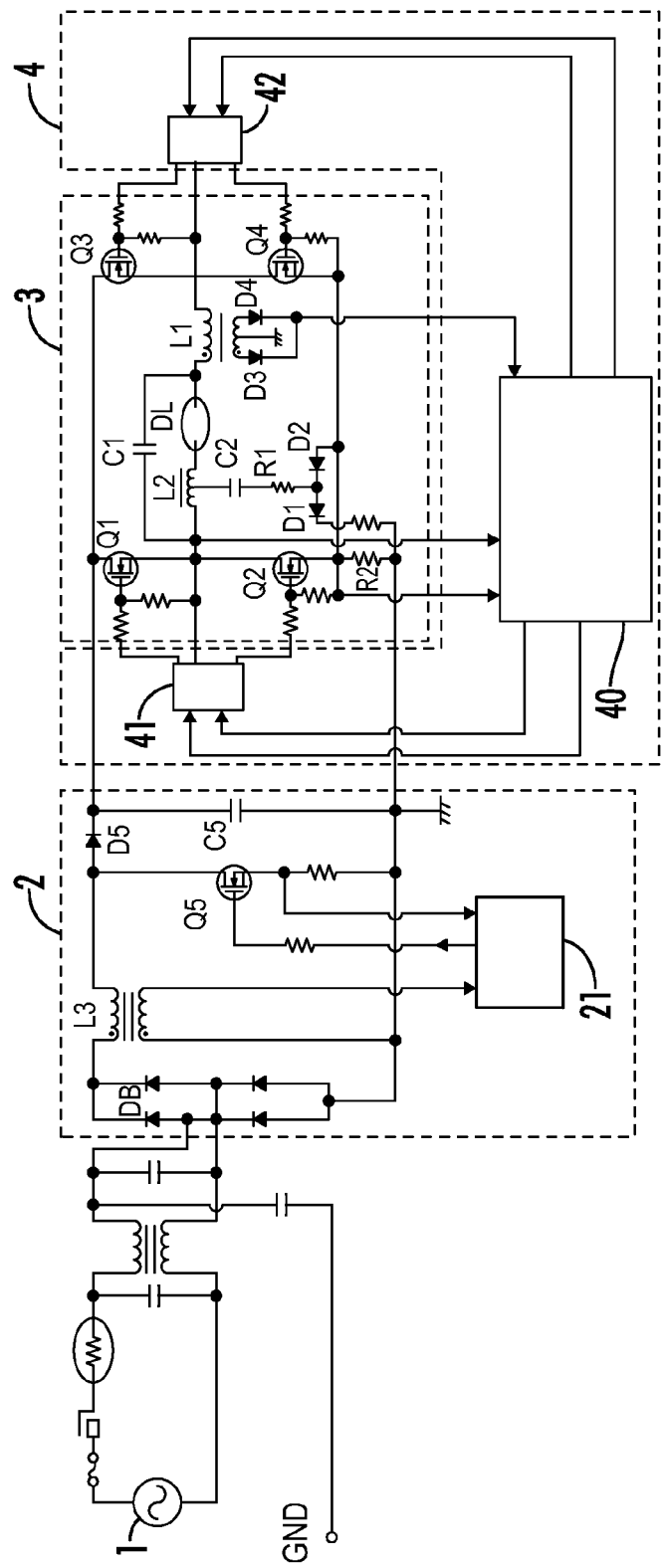
FIG. 21 is a circuit block diagram representing an example of a discharge lamp ballast as conventionally known in the art.
Figure 22:
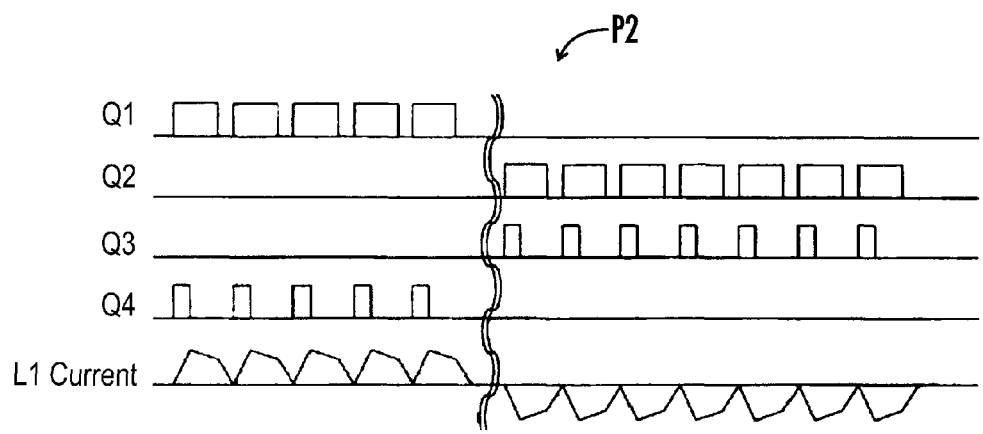
FIG. 22 is a graphical diagram representing an example of a electrode heating operation of the discharge lamp ballast as shown in FIG. 21.
Figure 23:
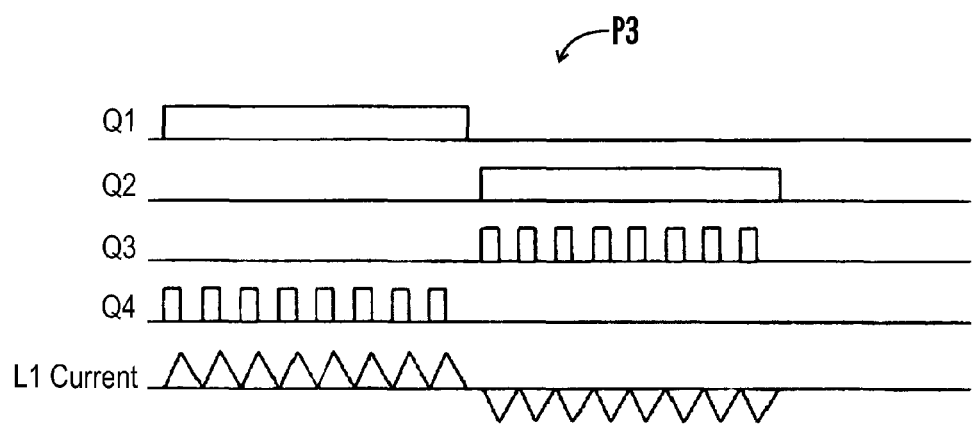
FIG. 23 is a graphical diagram representing an example of a stable lighting operation of the discharge lamp ballast as shown in FIG. 21.
Figure 24:
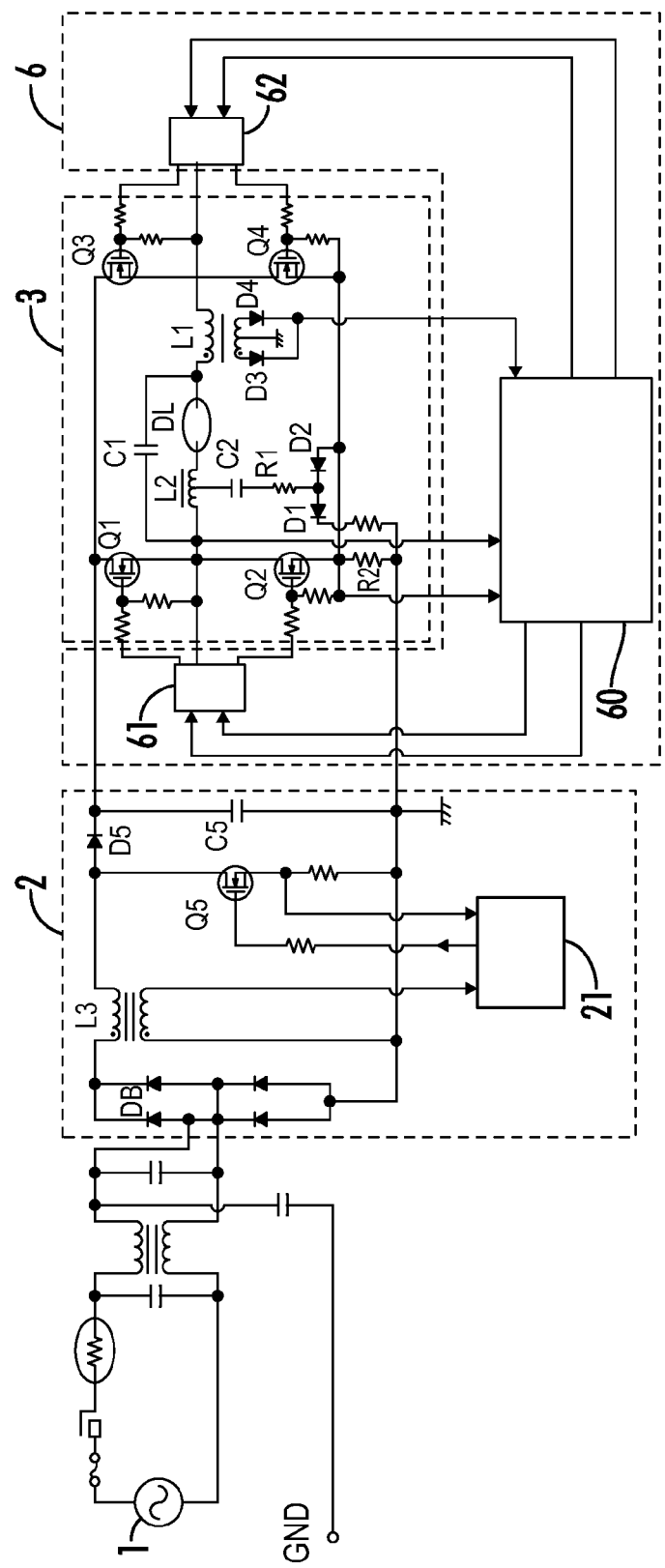
FIG. 24 is a circuit block diagram representing an embodiment of a discharge lamp ballast having a control circuit effective during a starting operation to generate a DC component in a lamp output voltage in accordance with the present invention.

Because a basic structural configuration of a discharge lamp ballast including an AC power source, a DC power supply, an inverter circuit and a resonant circuit in accordance with various embodiments of the present invention and as represented in FIG. 24 is substantially similar to that of the conventional example previously explained with reference to FIG. 21, further explanation about common portions may be omitted as redundant. However, the present disclosure refers to a control circuit 6 including an integrated circuit 60 and switch drive circuits 61 and 62 effective to control the performance of switching operations in accordance with various embodiments of a starting operation which differs in content from those previously described with respect to FIGS. 21 to 23.

Figure 1:
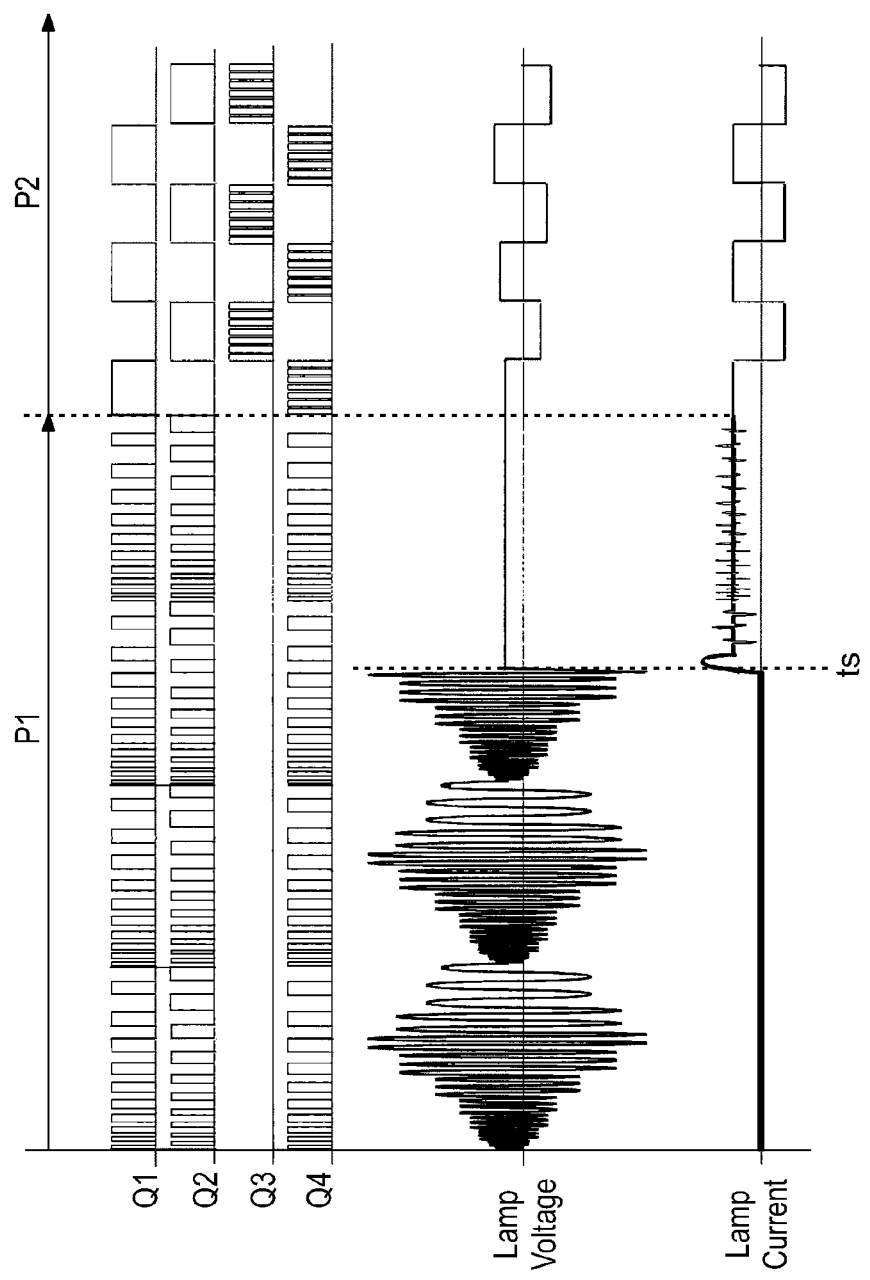
FIG. 1 is a graphical diagram representing operation of one embodiment of a discharge lamp ballast in accordance with the present invention.

In an embodiment of a starting operation P1 as shown in FIG. 1, a DC component is generated in an output voltage (namely, a voltage across a discharge lamp DL coupled to the lamp ballast, the voltage being hereinafter called a "lamp voltage") of the inverter 3 by alternately performing switching operations between a first state and a second state. In the first state, respective switching elements (a first switching element Q1 and a fourth switching element Q4 in FIG. 1) in one set of switching elements positioned diagonally to each other are turned ON while respective switching elements (a second switching element Q2 and a third switching element Q4 in FIG. 1) in the other set are turned off. In the second state, one switching element (the second switching element Q2 in FIG. 1) in the other set is turned on while the remaining switching elements are turned off, namely, maintaining one (e.g., a third switching element Q3 in FIG. 1) of the switching elements in an inverter 3 in an off state. In an embodiment so performed, on-duties of the respective switching elements Q1, Q2, and Q4 may be set at about 50%, respectively. Incidentally, in FIG. 1, the lamp voltage and the lamp current are set such that right directions thereof with respect to the configuration shown in FIG. 24 are positive, respectively. The same holds true to figures hereinafter shown unless otherwise stated.

Figure 2:
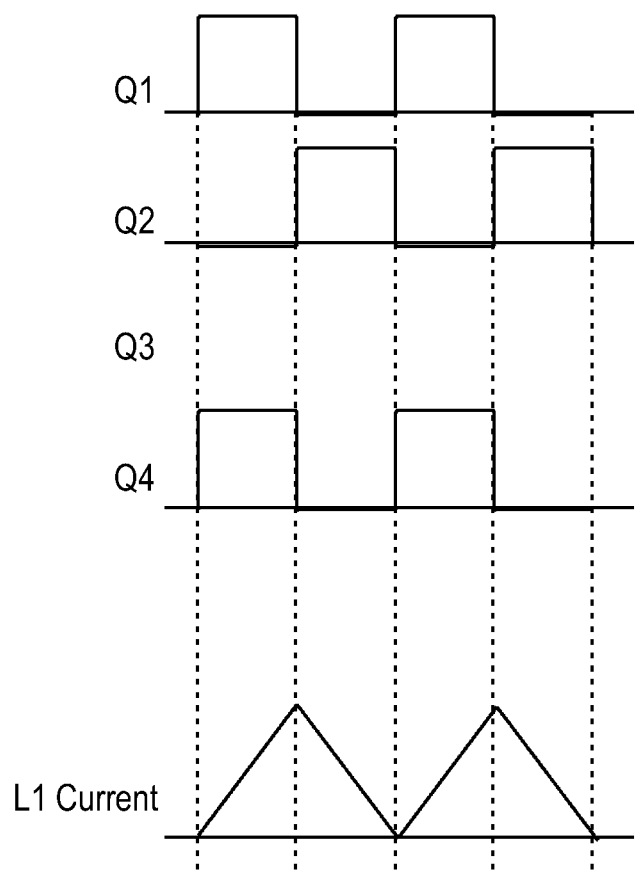
FIG. 2 is a graphical diagram representing current flow in a first inductor with respect to the embodiment of FIG. 1.

Prior to lighting of a discharge lamp DL, in the first state as described above where two switching elements of the switching elements Q1 to Q4 positioned diagonally to each other are ON (i.e., the first switching element Q1 and the forth switching element Q4 in FIG. 1), current from an output capacitor C5 of a DC power supply 2 serving as a power source flows in a loop including the two switching elements which are ON, a first capacitor C1, a first inductor L1, and the output capacitor C5 of the DC power supply 2, so that the first capacitor C1 is charged and energy is accumulated in the first inductor L1. Further, in the second state as described above where only one of the switching elements Q1 to Q4 is ON, current from the first inductor L1 serving as a power source flows in a loop composed of the one switching element which is ON (e.g., the second switching element Q2 in FIG. 1), a body diode of the switching element (e.g., the third switching element Q3 in FIG. 1) positioned diagonally to the one switching element, the first inductor L1, and the output capacitor C5 of the DC power supply 2, so that the energy accumulated in the first inductor L1 is discharged. As a result, the current flowing in the first inductor L1 forms a triangular wave toward one direction (a positive direction as shown in FIG. 2), so that the first capacitor C1 is charged by this current, and a DC component corresponding to a voltage across the first capacitor C1 is superimposed on an output voltage from the inverter 3 to the discharge lamp DL. Glow discharge is initiated in the discharge lamp DL by a resonant voltage generated by a resonant circuit of a second inductor L2 and a second capacitor C2 during the above operation, and transition from the above glow discharge to arc discharge is promoted by discharge of the first capacitor C1, whereby the discharge lamp DL starts to light.

The starting operation P1 in an embodiment continues for a predetermined starting time (for example, 900 ms) even if lighting of the discharge lamp DL has begun, so that lamp current starts to flow at such a time as represented by is in FIG. 1. During the starting operation P1 but after lighting of the discharge lamp DL, the discharge lamp DL is configured within the abovementioned loop in place of the first capacitor C1. Furthermore, the resonant circuit configured by the second inductor L2 and the second capacitor C2 superimposes spike-like or pulsed current onto the lamp current, with the pulses or spikes having a peak synchronized with a period of switching between the on state and the off state of the switching elements Q1 to Q4 in the inverter 3, which may have the effect of suppressing any extinguishing of the discharge lamp DL during the starting operation P1 after the time is at which the discharge lamp DL has ignited.

Further during the starting operation P1 a frequency sweep operation is performed and repeated multiple times, where an operating frequency of the inverter 3 (namely, an ON/OFF frequency of the respective switching elements Q1 to Q4) is gradually lowered from an upper limit of a predetermined sweep frequency range to a lower limit thereof. The predetermined sweep frequency range includes a resonant frequency (for example, 120 kHz, being a secondary resonant frequency of one third of a reference resonant frequency of 360 kHz) of the resonant circuit defined by the second inductor L2 and the second capacitor C2 in the inverter 3. Thereby, the operating frequency can reliably be caused to coincide with the abovementioned resonant frequency at any point in time during the starting operation P1 regardless of variations in the characteristic of the second inductor L2 or the second capacitor C2.

In FIG. 1, four repetitions of the sweep operation are shown, but the sweep operation may actually be performed, for example, 98 times during one starting operation P1. Further, operating frequency adjustments in the sweep operation are not limited to a gradual lowering of the operating frequency from an upper limit of the sweep frequency range to the lower limit thereof as previously described, and in various embodiments the operating frequency may be gradually raised from a lower limit of the sweep frequency range to the upper limit thereof.

Alternatively, a configuration may be adopted such that the operating frequency is reciprocated between the upper limit of the sweep frequency range and the lower limit thereof by alternately repeating a sweep operation which gradually raises the operating frequency and a sweep operation which gradually lowers the operating frequency.

Figure 3:
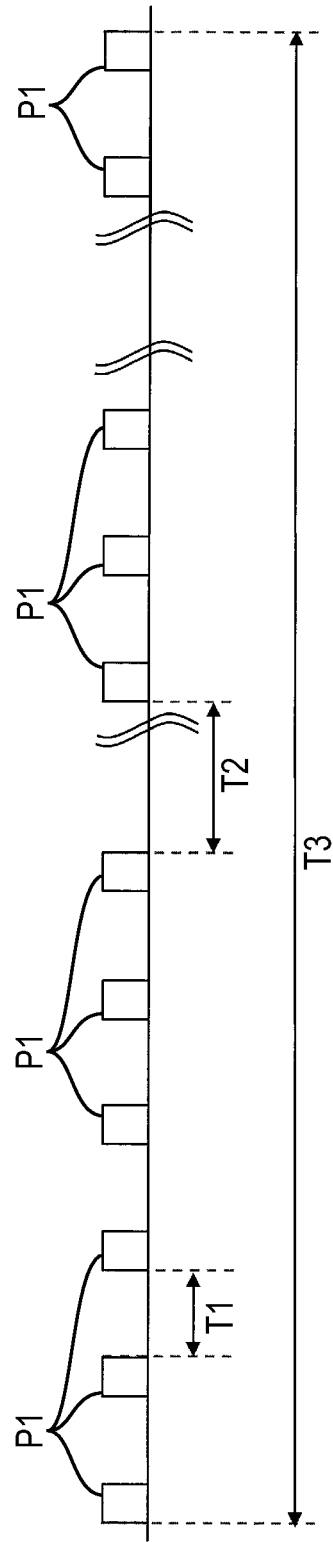
FIG. 3 is a graphical diagram representing operation when lighting of the discharge lamp has not been determined in the embodiment of FIG. 1.

In an embodiment, as shown for example in FIG. 3, the control circuit 6 (e.g., an integrated circuit 60) determines whether or not the discharge lamp DL is lit upon termination of the starting operation P1, namely at a time when the abovementioned starting time has elapsed, and when it determines that the discharge lamp DL has not been lit, it disables the inverter 3 (namely, maintains the respective switching elements Q1 to Q4 in the off state, respectively) for a predetermined first delay time T1 (for example, 5 seconds) and thereafter it begins the starting operation P1 again. After the control circuit 6 has repeated the starting operation P1 via the first stop time T1 a predetermined number of times (for example, 6 times), if the control circuit 6 determines that the discharge lamp DL has not yet been lit upon termination of the final starting operation P1 in a series of operations corresponding to the predetermined number of times (hereinafter, called "trial operations") it stops the inverter 3 for a predetermined second stop time T2 (for example, 90 seconds) longer than the first stop time T1 in order for example to lower pressure within the discharge lamp DL, and it starts the trial operations again. When lighting of the discharge lamp DL is not detected even after trial operations such as described above have been repeated for an upper limit threshold time T3 (for example, 30 minutes), the control circuit 6 may be configured to permanently discontinue the starting operation P1 thereafter.

Figure 4:
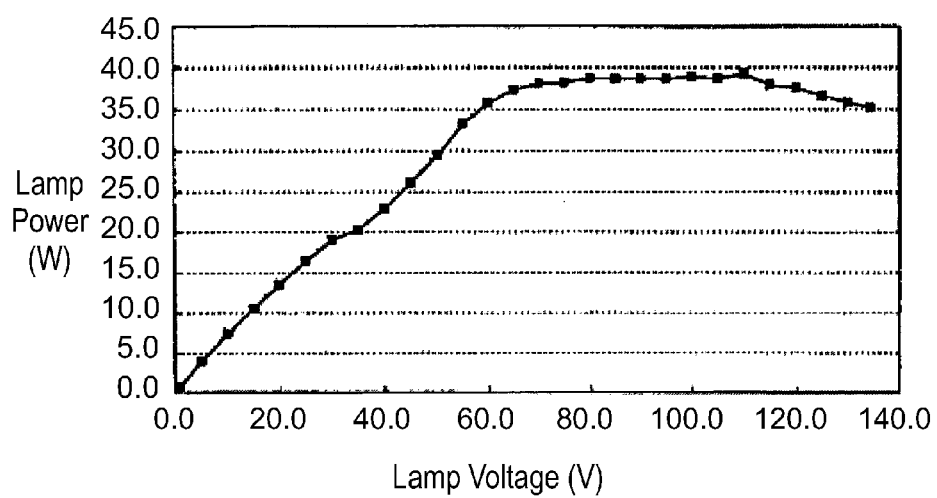
FIG. 4 is a graphical diagram representing an exemplary relationship between an effective value of a lamp voltage and lamp power.

Otherwise, if it is determined that the discharge lamp DL has been lit upon termination of the starting operation P1, the control circuit 6 performs a transition to a steady-state lighting operation P2. The control circuit 6 may in various embodiments be adapted to perform the transition to the steady-state lighting operation P2 via an electrode heating operation (not shown). The content of the electrode heating operation or the stable lighting operation P2 may be similar to those as previously known in the art and described for example with reference to FIGS. 22 and 23. In various embodiments an exemplary relationship between power (hereinafter called "lamp power") output from the inverter 3 to the discharge lamp DL and the lamp voltage, such as shown in FIG. 4, can be used in the electrode heating operation or the stable lighting operation P2.

According to the abovementioned configuration, because maintaining of the lamp current can be ensured after igniting of the discharge lamp DL due to generation of a DC component in the lamp voltage during the starting operation P1, the likelihood of the lamp becoming extinguished may be reduced as compared with the case that the lamp voltage during the starting operation P1 does not include the DC component.

Figure 5:
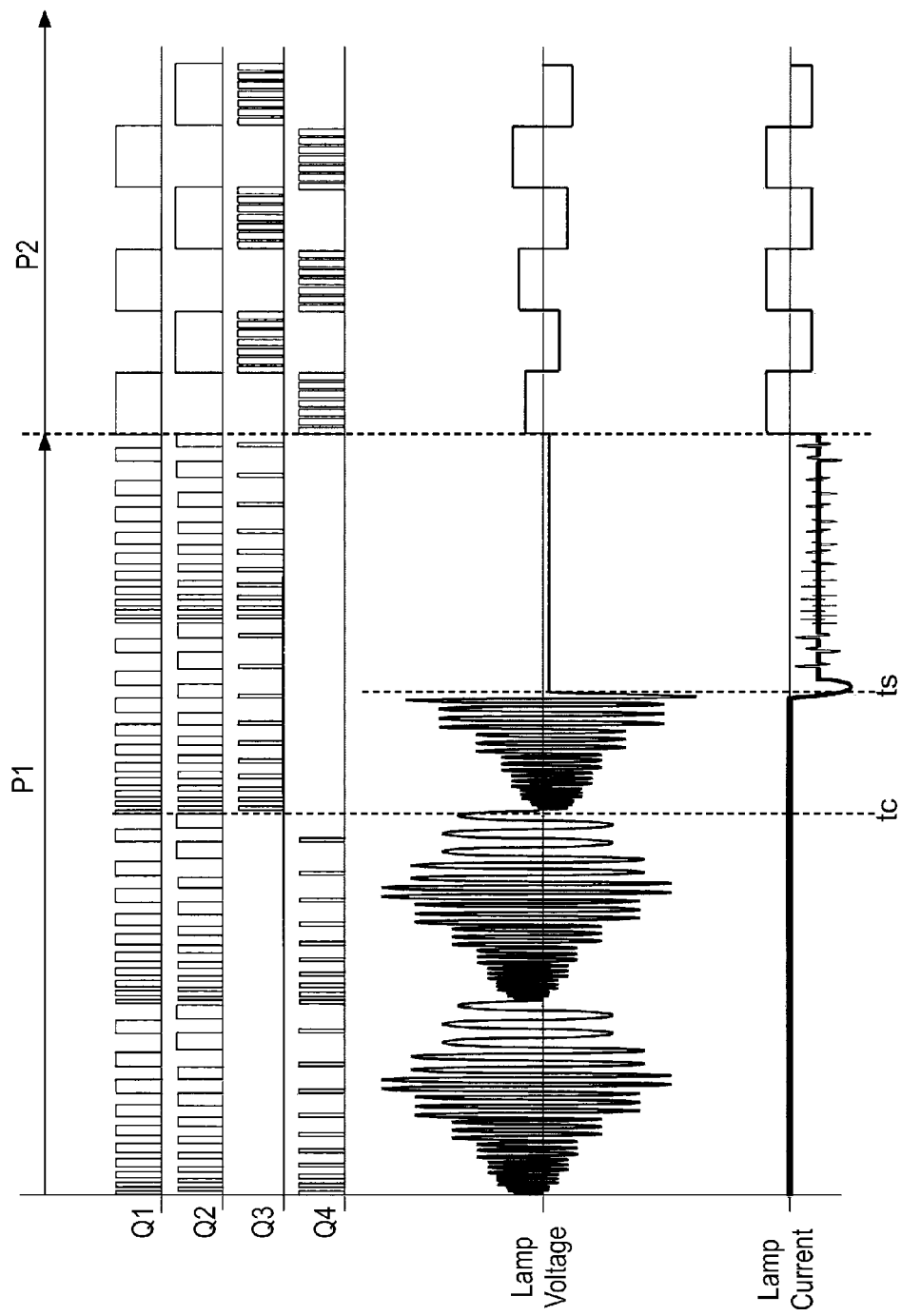
FIG. 5 is a graphical diagram representing another embodiment of operation of a discharge lamp ballast in accordance with the present invention.
Figure 6:
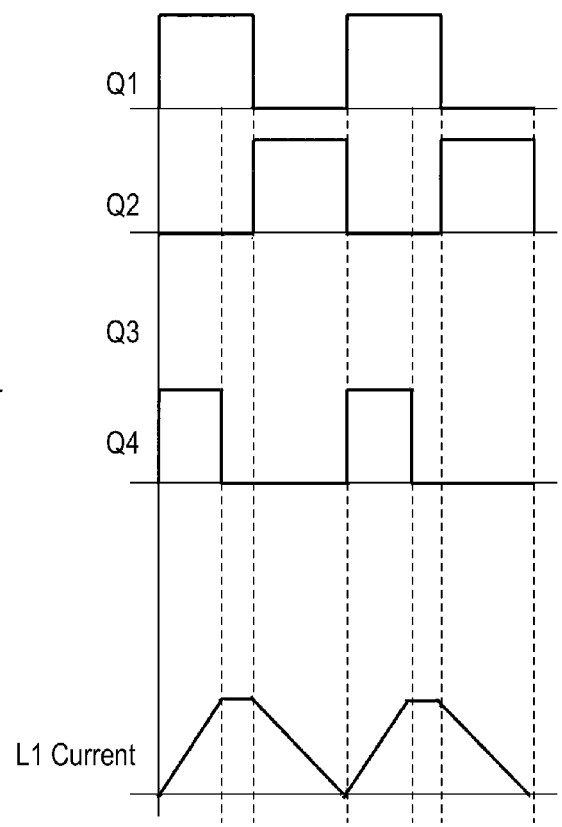
FIG. 6 is a graphical diagram representing current flow in a first inductor with respect to the embodiment of FIG. 5.

In an embodiment as shown in FIGS. 5 and 6, a starting operation P1 includes a first state, an intermediate state, and a second state which are cyclically repeated. In the first state, respective switching elements (the first switching element Q1 and the fourth switching element Q4 in the first half of the starting operation P1 in FIG. 5, and the second switching element Q2 and the third switching element Q3 in the second half in FIG. 5) in one set of the switching elements positioned diagonally to each other in the inverter 3 are turned on, respectively, while respective switching elements in the other set are turned off, respectively. In the intermediate state only one (the first switching element Q1 in the first half in FIG. 5 and the second switching element Q2 in the second half in FIG. 5) of the switching elements in the one set is turned on, while the remaining three switching elements are turned off. In the second state one (the second switching element Q2 in the first half in FIG. 5 and the first switching element Q1 in the second half in FIG. 5) of the switching elements in the other set is turned on, while the remaining three switching elements are turned off. That is, an on-duty of the one (the first switching element Q1 in the first half in FIG. 5 and the second switching element Q2 in the second half in FIG. 5) of the switching elements positioned diagonally to each other in the inverter 3 and simultaneously turned on is made larger than that of the other (the fourth switching element Q4 in the first half in FIG. 5 and the third switching element Q3 in the second half in FIG. 5). In the above intermediate state, current flowing in the first inductor L1 becomes approximately constant due to the fact that current flows in a closed loop which does not include the output capacitor C5 of the DC power supply 2, such as for example a loop including the first switching element Q1, the first inductor L1, and a body diode of the third switching element Q3 in the first half in FIG. 5. Thereby, as shown in FIG. 6, current flowing in the first inductor L1 becomes a trapezoidal waveform.

Figure 7:
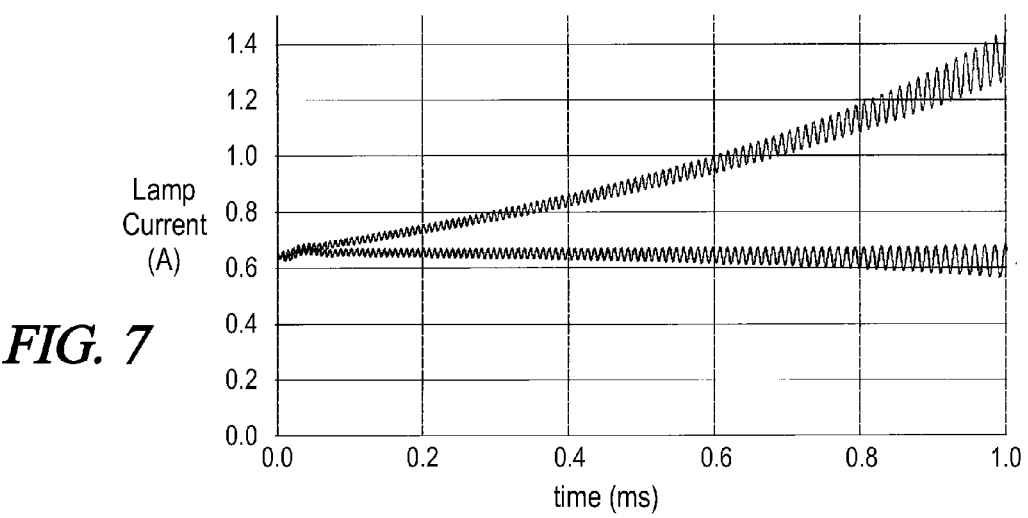
FIG. 7 is a graphical diagram representing a lamp current sweep operation for the embodiments shown of both FIG. 1 and FIG. 5.

Referring to FIG. 7, a change in the lamp current during one sweep operation for gradually lowering the operating frequency from 140 kHz to 70 Hz is shown by a curve B with regards to an embodiment of an operation such as shown in FIG. 1, and is shown by a curve A with regards to an embodiment of an operation such as shown in FIG. 5. In FIG. 7, the horizontal axis represents time, where a left end of the horizontal axis is a starting point of a sweep operation at which the operating frequency is 140 kHz, and a right end thereof is a terminal point of the sweep operation at which the operating frequency is 70 kHz. Although current flowing in the first inductor L1 during the starting operation P1 becomes a triangular wave in an embodiment of an operation as shown in FIG. 1 (see FIG. 2), current flowing in the first inductor L1 becomes a trapezoidal waveform in an embodiment of an operation as shown in FIG. 5 (see FIG. 6), so that the peak of the lamp current can be kept low as represented by curve A in FIG. 7. Accordingly, because smaller circuit components may be used for cases such as the first inductor L1, size-reduction of the discharge lamp ballast can be made possible.

By further reciprocating operation between the switching elements defined as the one set in the starting operation and the switching elements defined as the other set about a time point tc when a half (for example, 450 ms) of the starting time has elapsed from the beginning of the starting operation P1, or in other words by changing the switching element to be maintained in an off state from the third switching element Q3 to the fourth switching element Q4, the polarity of the DC component in the output of the inverter 3 is inverted. Thereby, failure of the discharge lamp DL to light due to insufficient heating in only one of the electrodes in the discharge lamp DL or life reduction due to progression of wear in one of the electrodes in the discharge lamp DL can be prevented. Further, extinguishing of the discharge lamp DL when the polarity is inverted as described above is suppressed by spike-like or pulsed components generated in the lamp current by the resonant circuit composed of the second inductor L2 and the second capacitor C2. The above-mentioned resonant circuit may thereby in various embodiments define a pulse superimposing circuit. Polarity inversion such as described above may be performed a plurality of times during the starting operation P1.

Figure 8:
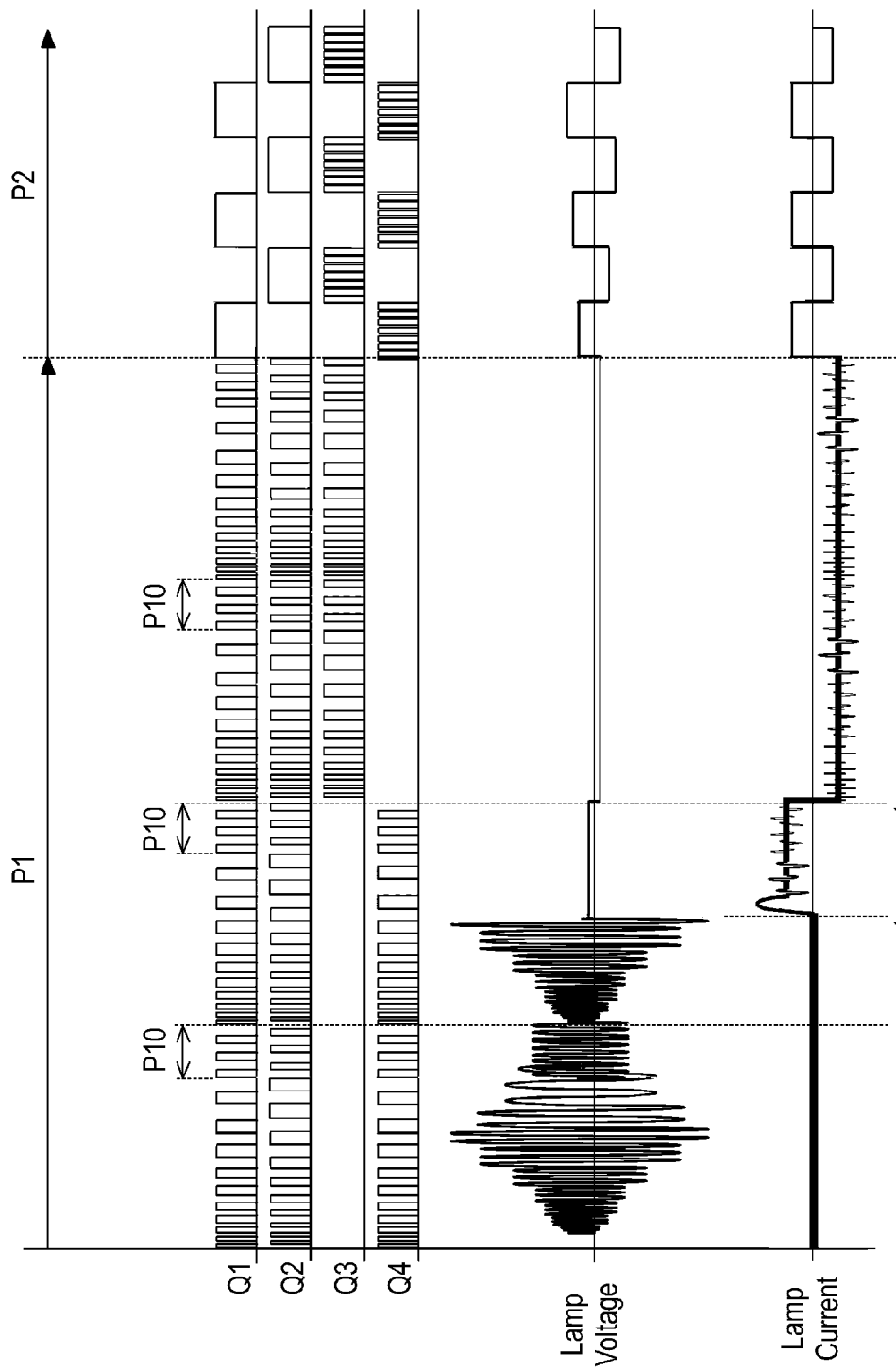
FIG. 8 is a graphical diagram representing another embodiment of operation of a discharge lamp ballast in accordance with the present invention.
Figure 9:
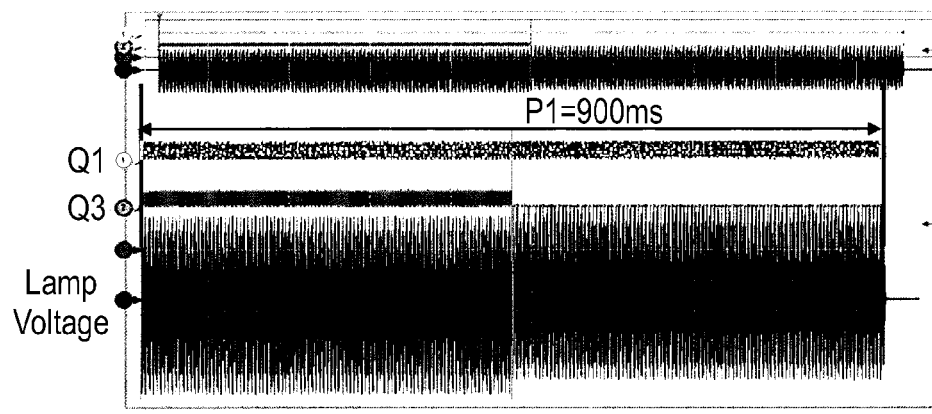
FIG. 9 is a graphical diagram representing waveforms from the embodiment of FIG. 8.

Referring now to FIG. 8, in an embodiment as shown the polarity of the DC component of the inverter output is also inverted as described above with regards to FIG. 5, wherein the switching element to be maintained in an off state is changed from the third switching element Q3 to the fourth switching element Q4 at a time point tc when a half (for example, 450 ms) of the starting time has elapsed from the beginning of the starting operation P1.

The control circuit 6 further performs an intermediate frequency operation P10 wherein the operating frequency is maintained in a predetermined intermediate frequency lower than an upper limit frequency of the sweep frequency range (hereinafter, called "upper limit frequency") and higher than a lower limit frequency of the sweep frequency range (hereinafter, called "lower limit frequency") for a predetermined time associated with each individual sweep operation, namely, for each operation of switching the operating frequency from the lower limit of the sweep frequency range to the upper limit thereof, in the starting operation P1.

The DC component of the lamp current when the operating frequency is f is described herein as I (f), the upper limit frequency is described as ft, the lower limit frequency is described as fb, and the intermediate frequency is described as fm. Thereby, a bottom value of the lamp current when the operating frequency is switched from the lower limit frequency fb to the intermediate frequency fm is described as I (fm)−(I (fb)−I (fm)), and the bottom value of the lamp current when the operating frequency is switched from the intermediate frequency fm to the upper limit frequency ft is described as I (ft)−(I (fm)−I (ft)). If the above-mentioned two bottom values are equal to each other, it may be stated that the bottom value of the lamp current approaches 0 due to frequency switching such as from the lower limit frequency fb to the intermediate frequency fm or from the intermediate frequency fm to the upper limit frequency ft so that extinguishing of the discharge lamp DL can be substantially avoided. Therefore, it is desirable to adopt such an intermediate frequency that the abovementioned bottom values become equal to each other, namely, where the equation I (fm)=(2×I (ft)+I (fb))/3 is satisfied.

As described above, by interposing the intermediate frequency operation P10 between sweep operations, extinguishing of the discharge lamp DL due to an instantaneous reduction in lamp current can be suppressed as compared with the case that the intermediate frequency operation is not included.

Figure 10:
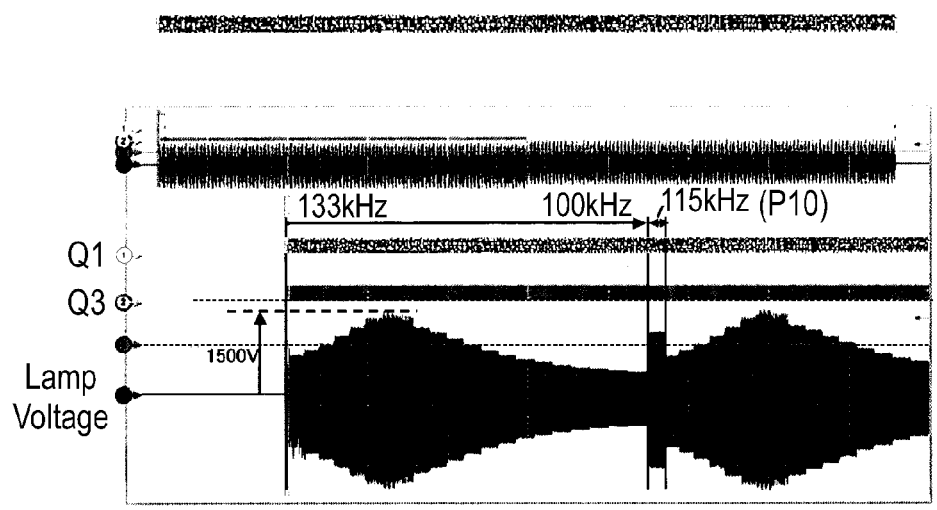
FIG. 10 is an enlarged graphical diagram of the waveforms in FIG. 9.
Figure 11:
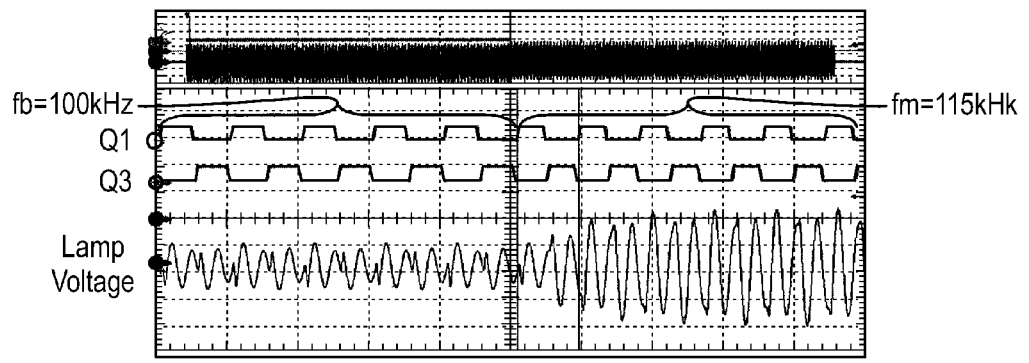
FIG. 11 is an enlarged graphical diagram of the waveforms in FIG. 10.
Figure 12:
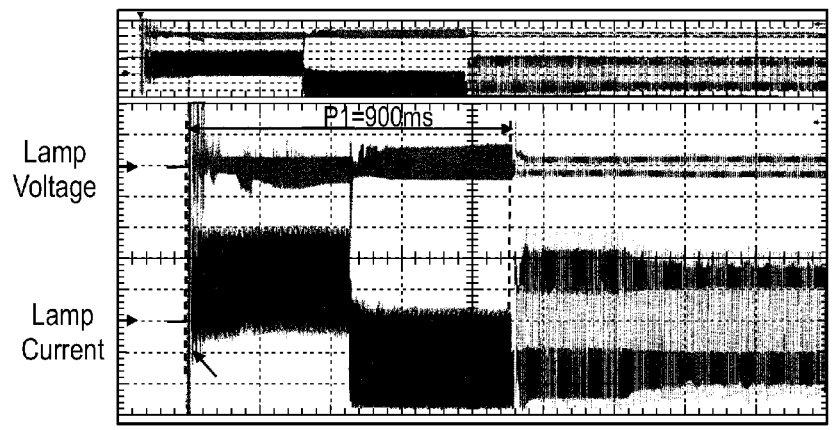
FIG. 12 is a graphical diagram representing an example of waveforms of the lamp voltage and the lamp current in the embodiment of FIG. 8.
Figure 13A:
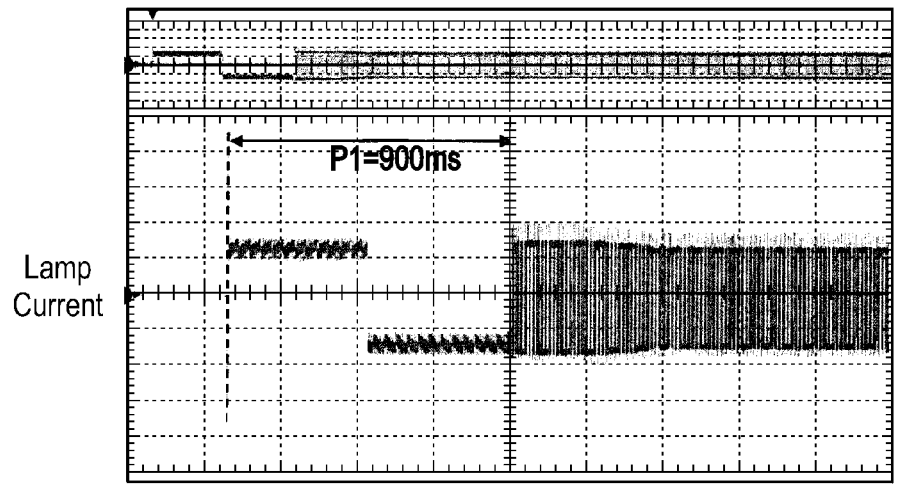
FIG. 13A is a graphical diagram representing a waveform obtained by removing spike-like components from the lamp current as shown in FIG. 12.
Figure 13B:
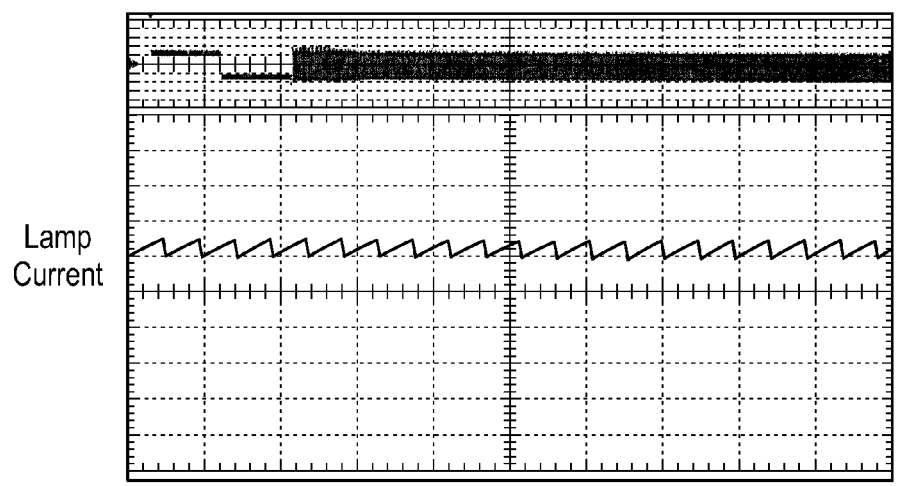
FIG. 13B is an enlarged graphical diagram of the waveform in FIG. 13A.
Figure 14:
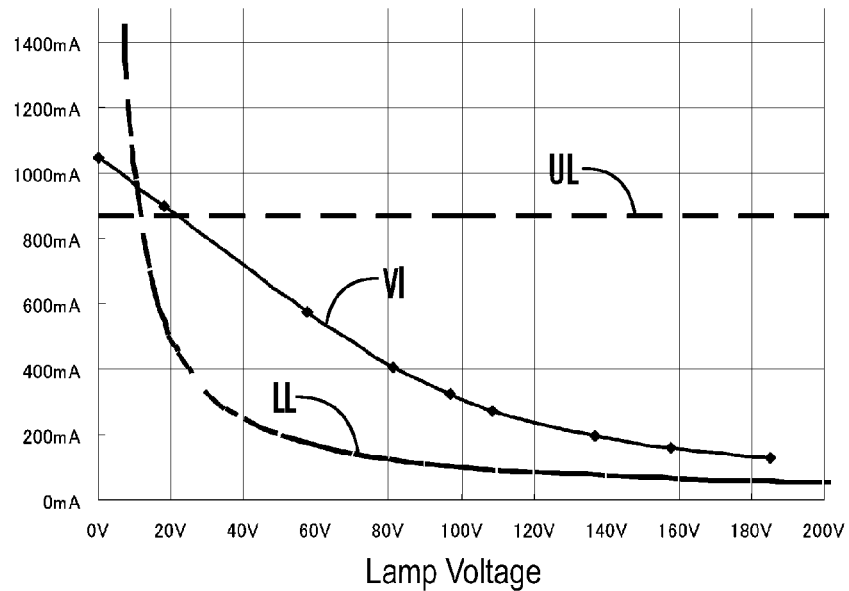
FIG. 14 is a graphical diagram representing an exemplary relationship between a lamp voltage and a lamp current during a starting operation in the embodiment of FIG. 8.

Referring now to FIGS. 9-12, and with continued reference generally to a ballast as shown in FIG. 24, examples are shown of a lamp voltage waveform in a case that the output voltage of the DC power supply 1 is set at 350 V, the inductance of the first inductor L1 is set at 680 μH, the capacitance of the first capacitor C1 is set to 0.22 μF, the inductance of a primary winding (shunt winding) of the second inductor L2, or in other words a winding portion positioned proximate the switching elements Q1 and Q2 (the left side in FIG. 2) with respect to the tap, is set at 90 μH, the number of turns of the primary winding in the second inductor L2 is set at 48 turns, the number of the total turns is set at 48.5 turns, and the resistor R1 connected to the second capacitor C2 is arranged as a resistive series circuit composed of three resistors having a resistance value of 6.2Ω, respectively. In a case that the upper limit frequency ft is set to 133 kHz, the lower limit frequency is set at 100 kHz, and the intermediate frequency fm is set to 115 kHz. Examples of a waveform of the lamp current are shown in FIGS. 12, 13A, and 13B, and a relationship between the lamp current and the lamp voltage during the starting operation P1 is further shown by a curve VI in FIG. 14. FIGS. 10, 11, and 13B show a portion of FIG. 9, a portion of FIG. 10, and a portion of FIG. 13A in an enlarged manner, respectively. Further, FIG. 13A shows a waveform obtained by removing a spike-shaped component from the waveform of the lamp current shown in FIG. 12. In the example shown in FIG. 12, the discharge lamp DL ignites just after beginning of the starting operation P1 so that lamp current starts to flow. In the above example, the maximum value of the absolute value of the lamp voltage during the sweep operation reaches about 1500 V. In FIG. 14, a broken line UL and a curve LL show an upper limit and a lower limit of a region which is thought to be an allowable range of the lamp current. That is, it is considered that when the lamp current is below the allowable range, a starting performance of the discharge lamp DL deteriorates to an unacceptable extent, while equally unacceptable high electric stresses act on the discharge lamp DL when the lamp current is above the allowable range.

In an embodiment of an operation as shown in FIG. 8 and described above, there is a possibility that at the time tc when the polarity of the DC component of the lamp current is inverted during the starting operation P1, the first capacitor C1 connected in parallel with the discharge lamp DL may be discharged so that current is increased instantaneously and the current imparts excessive electrical stresses upon circuit components.

Figure 15:
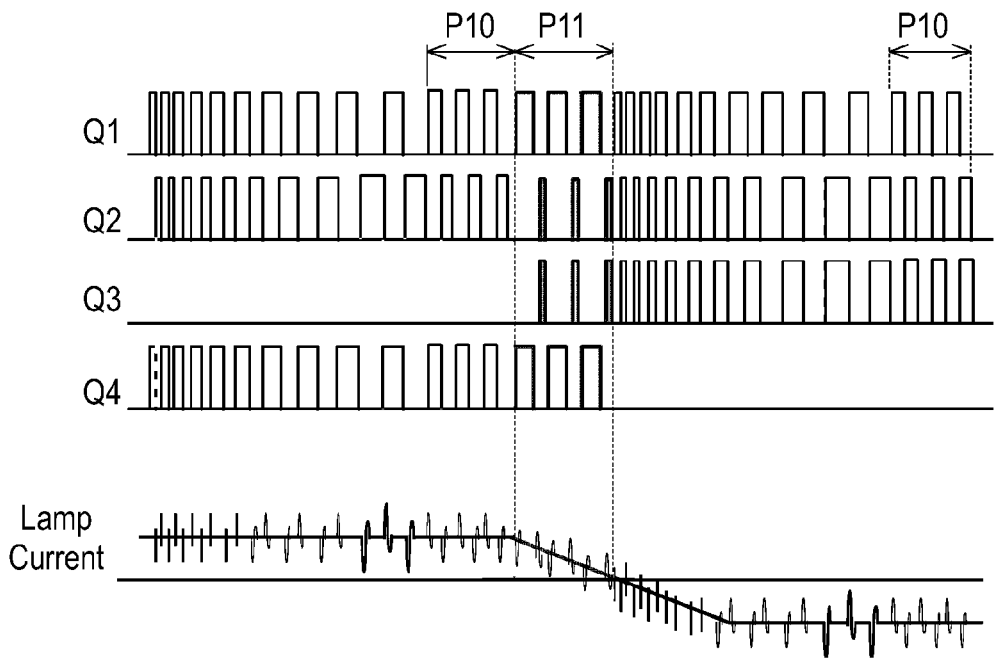
FIG. 15 is a graphical diagram representing another embodiment of operation of a discharge lamp ballast in accordance with the present invention.

Therefore, in various embodiments such as shown for example in FIG. 15, when the polarity of the DC component of the lamp current is inverted in the starting operation P1, a transient operation P11 of gradually reducing the voltage across the first capacitor C1 is performed. The transient operation P11 alternately drives ON/OFF first and second sets of switching elements positioned diagonally to each other in the inverter 3, and makes the on-duty of respective switching elements (the first switching element Q1 and the fourth switching element Q4 in FIG. 15) in one set of switching elements positioned diagonally to each other larger than the on-duty of respective switching elements (the second switching element Q2 and the third switching element Q3 in FIG. 15) in the other set.

According the above configuration, because the voltage across the first capacitor C1 is gradually lowered during the transient operation P11, electric stresses acting on circuit components can be somewhat suppressed due to discharge current of the first capacitor C1 when the polarity of the DC component of the lamp current is inverted, as compared with the case that the transient operation P11 is not performed.

Figure 16:
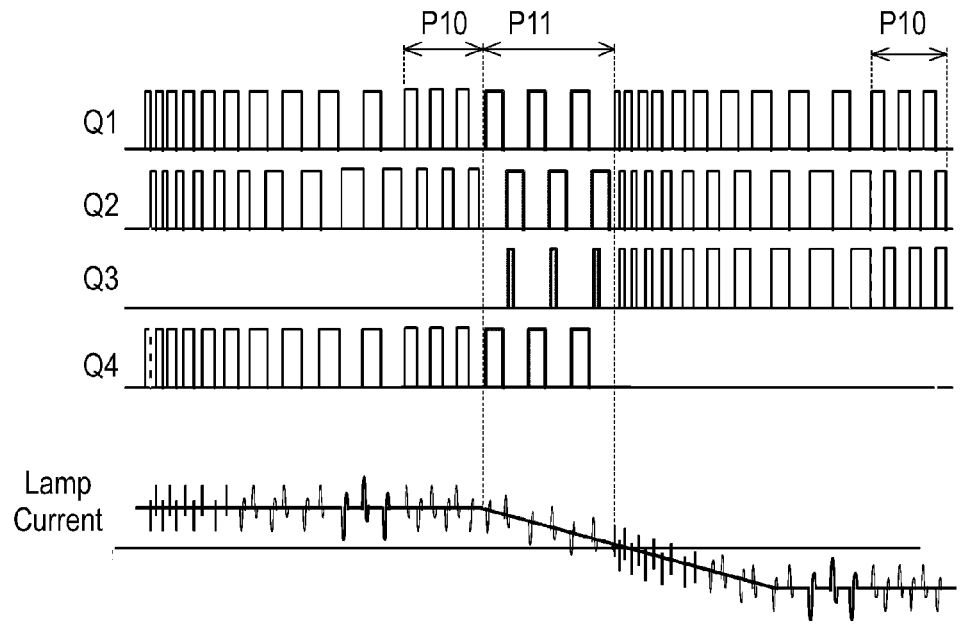
FIG. 16 is a graphical diagram representing a modified example of the embodiment shown in FIG. 15.

The transient operation P11 is not limited to the transient operation shown in FIG. 15 and such a configuration may be adopted wherein only the on-duty of one switching element (the third switching element Q3 in FIG. 16) in the other set is made smaller than on-duties of the remaining three switching elements, such as shown for example in FIG. 16. In other words, the transient operation P11 shown in FIG. 16 periodically and cyclically repeats a state where a first set of switching elements (for example the first switching element Q1 and the fourth switching element Q4 in FIG. 16) are turned on, and the other (second) set of switching elements (the second switching element Q2 and the third switching element Q3 in FIG. 16) are turned off, a state where the second set of switching elements are turned on and the first set of switching elements are turned off, and a state where one switching element (e.g., the second switching element Q2 in FIG. 16) of the second set of switching elements is turned on and the remaining three switching elements are turned off, respectively.

Figure 17:
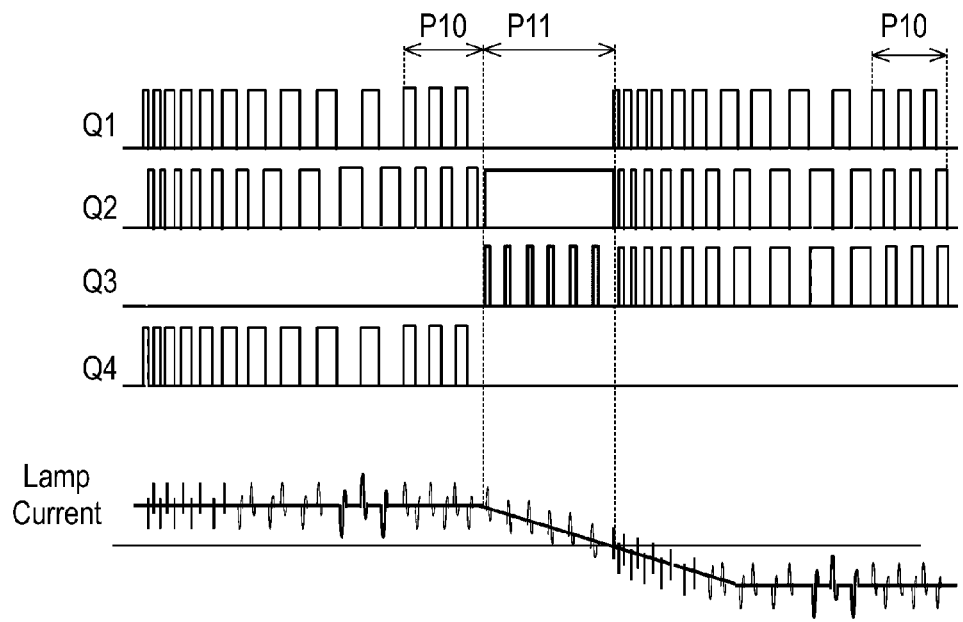
FIG. 17 is a graphical diagram representing another modified example of the embodiment shown in FIG. 15.

Alternatively, as shown in FIG. 17, the transient operation P11 may be configured such that the switching elements (the first switching element Q1 and the fourth switching element Q4 in FIG. 17) in the first set of switching elements positioned diagonally to each other are maintained in the off state, and one (the second switching element Q2 in FIG. 17) of the switching elements in the second set is maintained in the on state while the other (the third switching element Q3 in FIG. 17) of the switching elements is periodically driven ON/OFF.

Furthermore, various transient operations P11 such as described above can be applied to other embodiments as previously described herein.

Figure 18:
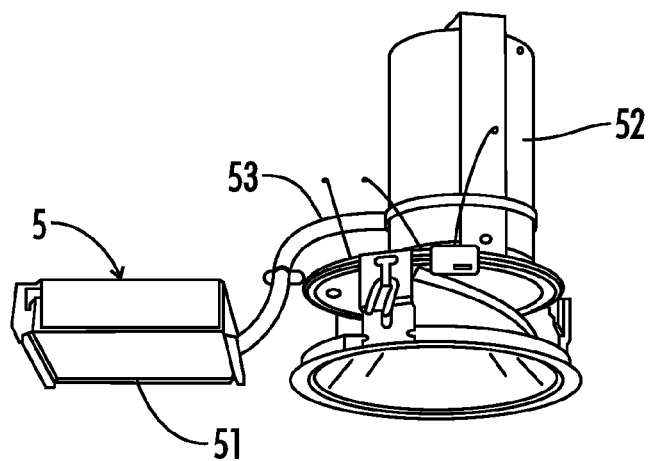
FIG. 18 is a perspective view showing an example of a light fixture using an embodiment of the discharge lamp ballast of the present invention.
Figure 19:
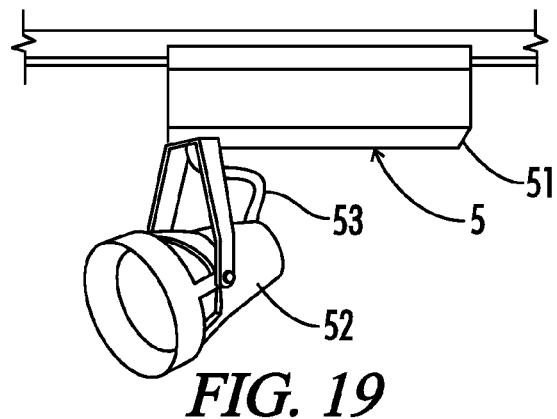
FIG. 19 is a perspective view showing another example of a light fixture using an embodiment of the discharge lamp ballast of the present invention.
Figure 20:
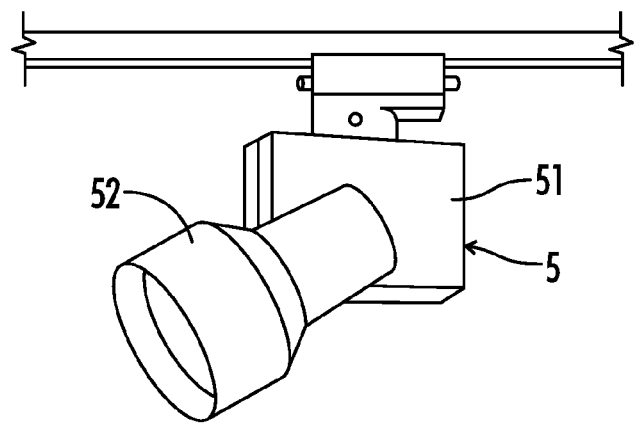
FIG. 20 is a perspective view showing still another example of a light fixture using an embodiment of the discharge lamp ballast of the present invention.

A discharge lamp ballast and methods of operation may within the scope of various embodiments of the present invention be used in light fixtures 5, for example, such as shown in FIGS. 18-20. The light fixtures 5 shown in FIGS. 18-20 are provided with main housings 51 for securing the discharge lamp ballast and lamp housings 52 for securing the discharge lamp DL. The light fixture 5 shown in FIG. 18 and the light fixture 5 shown in FIG. 19 are provided with power feeders 53 electrically connecting the discharge lamp ballast and the discharge lamp DL with each other, respectively. The light fixture 5 shown in FIG. 18 is a down light where both the main housing 51 and the lamp housing 52 are fixed to a ceiling face, while the light fixture 5 shown in FIG. 19 and the light fixture 5 shown in FIG. 20 are spot lights including the lamp housing 52 mounted in an oscillating manner to the main housing 51 fixed to a mounting face such as a ceiling face. As the various light fixtures 5 such as described above can be otherwise be realized by well-known techniques, detailed explanation thereof is omitted herein.

Thus, although there have been described particular embodiments of the present invention of a new and useful Electronic Ballast and Method for Providing a DC Voltage Component During Lamp Startup, it is not intended that such references be construed as limitations upon the scope of this invention except as set forth in the following claims.

What is claimed is:

1. A discharge lamp ballast comprising:
an inverter circuit including first and second pairs of four switching elements in a full bridge configuration, and a resonant circuit having a resonant frequency connected between output terminals of the switch pairs, the inverter circuit further adapted to output AC power for driving a discharge lamp; and
a control circuit adapted to control switch states of the switching elements and thereby to generate the output AC power,
wherein the control circuit during a starting operation is adapted to control the inverter switching elements for a predetermined time so as to make an operating frequency of the output AC power sufficiently close to the resonant frequency of the resonant circuit, wherein a high voltage is generated for igniting the discharge lamp, and
the control circuit is further adapted to control the inverter switching elements in the starting operation so as to periodically and alternately repeat a state of
turning on the switching elements in one of the first or second sets of switching elements, respectively, and turning off the switching elements in the other set, respectively, and a state of turning on only one of the switching elements in the other set and turning off the remaining three switching elements, respectively,
wherein a DC component is generated in the output voltage during the starting operation.

2. The discharge lamp ballast of claim 1, wherein the control circuit at a predetermined point during the starting operation is adapted to interchange switching operations between the first and second sets of switching elements, and
the control circuit is further adapted to control the inverter in a transient operation between each interchange of switching operations, each transient operation further comprising gradually lowering the output voltage for a predetermined period of time.

3. The discharge lamp ballast of claim 2, wherein the transient operation further comprises alternately and periodically turning on the first and second sets of switching elements, and an on-duty of one of the respective sets of switching elements is made higher than an on-duty of the other set of respective switching elements.

4. The discharge lamp ballast of claim 2, wherein the transient operation further comprises periodically and cyclically repeating a state of turning on the switching elements in one of the sets of switching elements and turning off the switching elements in the other set, a state of turning on the switching elements in the other set and turning off the respective switching elements in the one set, and a state of turning on one of the switching elements in the other set and turning off the remaining three switching elements, respectively.

5. The discharge lamp ballast of claim 2, wherein the transient operation further comprises turning off the switching elements in one of the sets of switching elements, maintaining one of the switching elements in the other set in an ON state and periodically turning on and off the other of the switching elements in the other set.

6. The discharge lamp ballast of claim 1, wherein the control circuit is adapted to control the inverter in the starting operation so as to periodically and cyclically repeat a state of turning on the switching elements in one of the first or second sets of switching elements, respectively, and turning off the switching elements in the other set, respectively, a state of turning on only one of the switching elements in the one set and turning off the remaining three switching elements, respectively, and a state of turning on only one of the switching elements in the other set and turning off the remaining three switching elements, respectively.

7. The discharge lamp ballast of claim 1, wherein the control circuit is adapted to gradually change the operating frequency of the inverter within a predetermined sweep frequency range including the resonant frequency of the resonant circuit in the starting operation.

8. The discharge lamp ballast of claim 7, wherein the control circuit is adapted to gradually decrease the operating frequency of the inverter from an upper limit frequency of the sweep frequency range to a lower limit frequency thereof in the starting operation.

9. The discharge lamp ballast of claim 7, wherein the control circuit is adapted to change the operating frequency of the inverter a plurality of times in the starting operation, and between each of the plurality of changes in the operating frequency the control circuit is further adapted to maintain the operating frequency of the inverter at a frequency lower than the upper limit frequency of the sweep frequency range and higher than the lower limit frequency of the sweep frequency range for a predetermined period of time.

10. The discharge lamp ballast of claim 7, wherein the control circuit is adapted to control the inverter so as to invert the polarity of the DC component of the output voltage at least once during the starting operation.

11. The discharge lamp ballast of claim 7, wherein the control circuit is adapted to detect lighting of the discharge lamp and subsequently to control the inverter to superimpose spike components on the output current.

12. A method of operating a discharge lamp ballast comprising an inverter circuit having four switches arranged in a full bridge configuration, a resonant circuit having a resonant frequency and a control circuit, the method comprising:
  (a) adjusting the operating frequency of the inverter switching elements within a predetermined sweep frequency range during a starting operation having a predetermined time duration, the frequency range including the resonant frequency of the resonant circuit wherein a high voltage is generated near the resonant frequency for igniting the discharge lamp during the starting operation; and
  (b) further during the starting operation, periodically and alternately repeating a state of turning on a first set of the four switching elements positioned diagonally with respect to each other, and turning off a second set of the four switching elements positioned diagonally with respect to each other, and a state of turning on only one of the second set of switching elements and turning off the remaining three switching elements, respectively, so as to generate a DC component in the output voltage during the starting operation.

13. The method of claim 12, further comprising the step of:
  (c) interchanging the switching operations in step (b) between the first and second sets of switching elements at a predetermined time during the starting operation.

14. The method of claim 13, wherein step (b) comprises: periodically and cyclically repeating a state of turning on the switching elements in one of the first or second sets of switching elements, respectively, and turning off the switching elements in the other set, respectively, a state of turning on only one of the switching elements in the one set and turning off the remaining three switching elements, respectively, and a state of turning on only one of the switching elements in the other set and turning off the remaining three switching elements, respectively.

15. The method of claim 14, further comprising the step of:
  (d) performing a transient operation between each interchange of switching operations, each transient operation further comprising gradually lowering the output voltage for a predetermined period of time by alternately and periodically turning on the first and second sets of switching elements, and making an on-duty of one of the respective sets of switching elements higher than an on-duty of the other set of respective switching elements.

16. The method of claim 14, further comprising the step of:
  (d) performing a transient operation between each interchange of switching operations, each transient operation further comprising periodically and cyclically repeating a state of turning on the switching elements in one of the sets of switching elements and turning off the switching elements in the other set, a state of turning on the switching elements in the other set and turning off the respective switching elements in the one set, and a state of turning on one of the switching elements in the other set and turning off the remaining three switching elements, respectively.

17. The method of claim 14, further comprising the step of:
  (d) performing a transient operation between each interchange of switching operations, each transient operation further comprising turning off the switching elements in one of the sets of switching elements, maintaining one of the switching elements in the other set in an ON state and periodically turning on and off the other of the switching elements in the other set.

18. A light fixture comprising:
  a lamp housing adapted to secure a discharge lamp;
  a discharge lamp ballast further comprising an inverter circuit having four switches arranged in a full bridge configuration, a resonant circuit having a resonant frequency and a control circuit; and
  a main housing adapted to secure said discharge lamp ballast,
  wherein said control circuit of said discharge lamp ballast is adapted during a starting operation having a predetermined time duration to adjust an operating frequency of the inverter switches within a predetermined sweep frequency range including the resonant frequency of the resonant circuit, wherein a high voltage is generated near the resonant frequency for igniting the discharge lamp during the starting operation, and
  said control circuit further adapted during the starting operation to periodically and alternately repeat a state of turning on a first set of switching elements positioned diagonally with respect to each other and turning off a second set switching elements positioned diagonally with respect to each other, and a state of turning on only one of the second set of switching elements and turning off the remaining three switching elements, respectively, so as to generate a DC component in the output voltage during the starting operation.

* * * * *